US006125692A

United States Patent [19]

Marmonier

[11] Patent Number: 6,125,692

[45] Date of Patent: Oct. 3, 2000

[54] DENSITY SENSOR FOR MONITORING THE RATE OF LEAKAGE FROM A SWITCHGEAR CASE WITH IMPROVED RELIABILITY

[75] Inventor: Jean Marmonier, Aix Les Bains, France

[73] Assignee: GEC Alsthom T & D SA, Paris, France

[21] Appl. No.: 09/176,958

[22] Filed: Oct. 22, 1998

[30] Foreign Application Priority Data

Oct. 23, 1997 [FR] France .................................... 9713300

[51] Int. Cl.[7] ............................ G01M 3/32; G01L 19/04; H02B 13/025; G08B 21/00

[52] U.S. Cl. ............................ 73/40; 73/23.28; 73/23.29; 73/30.01; 73/30.02; 73/30.04; 340/605; 340/632; 340/638; 374/142; 374/143

[58] Field of Search ......................... 73/40, 23.28, 23.29, 73/30.01, 30.02, 30.04; 340/605, 614, 626, 632, 635, 638; 374/142, 143

[56] References Cited

U.S. PATENT DOCUMENTS

| | | | |
|---|---|---|---|
| 3,077,527 | 2/1963 | Goldbach et al. . | |
| 3,934,454 | 1/1976 | Simo | 374/143 |
| 4,206,630 | 6/1980 | Powers . | |
| 5,388,451 | 2/1995 | Stendin et al. | 374/143 |
| 5,421,190 | 6/1995 | Brandle et al. | 73/30.01 |
| 5,502,435 | 3/1996 | Ralston | 73/30.02 |
| 5,693,873 | 12/1997 | Thuries et al. | 73/23.28 |
| 5,889,467 | 3/1999 | Marmonier et al. | 73/40.5 R |

FOREIGN PATENT DOCUMENTS

| | | | |
|---|---|---|---|
| 0 335 470 A2 | 10/1989 | European Pat. Off. . | |
| 2607158 | 8/1977 | Germany | 73/40 |
| 2714384 | 10/1978 | Germany | 73/30.02 |
| 42 18 926 A1 | 12/1993 | Germany | 73/30.01 |
| 3-222613 | 10/1991 | Japan | 73/40 |
| 7-129870 | 5/1995 | Japan | 73/40 |

*Primary Examiner*—Daniel S. Larkin
*Attorney, Agent, or Firm*—Sughrue, Mion, Zinn, Macpeak & Seas, PLLC

[57] ABSTRACT

A density sensor for monitoring a rate of leakage from the case of electrical switchgear filled with dielectric gas under pressure, the sensor comprising a fixing support mounted from the outside in the thickness of the case and communicating with the dielectric gas. A radiator is placed around the fixing support of the density sensor, thereby enabling a measurement artifact that is due to the exposure of the case and of the sensor to solar radiation to be transformed in such a manner that any risk of untimely crossing of a low density threshold is eliminated.

3 Claims, 3 Drawing Sheets

DENSITY SENSOR FOR MONITORING THE RATE OF LEAKAGE FROM A SWITCHGEAR CASE WITH IMPROVED RELIABILITY

The invention relates to a density sensor for monitoring the rate of leakage from the case of an electrical switchgear filled with a dielectric gas under pressure, the sensor comprising a fixing support mounted from the outside in the thickness of the case and in communication with the dielectric gas.

BACKGROUND OF THE INVENTION

An example of an application for such a sensor is constituted by a generator or network circuit breaker mounted in a case of metal cladding, or a substation in a metal case, the case containing sulfur hexafluoride $SF_6$ at a pressure of a few bars. The density sensor is fixed to the case from the outside and serves to monitor the rate at which the dielectric gas leaks out from the case by comparing density readings made throughout the time the circuit breaker is in use. Since leaks are inevitable, even if very small, after several years of use, density tends towards a threshold value below which the operation of the circuit breaker or the switchgear is no longer reliable. It is then necessary to inject dielectric gas so as to raise the density to a nominal value, e.g. equal to 3.5 bars. When the threshold is crossed, it is the general practice to raise an alarm to cause action to be taken on the circuit breaker, specifically to proceed with injection of dielectric gas.

A density sensor comprises a pressure detector and a temperature detector disposed inside the fixing support so as to be in communication with the dielectric gas, and a measurement unit for calculating the density of the gas for each pair of pressure and temperature values P and T that are acquired at the same time.

Curve 21 in FIG. 1 relates to an experiment performed using a sensor of the type described above. The metal cladding case was installed on an operating site in the open air, which is the case of a large fraction of sites on which such an electrical switchgear is operated. The case extended in a longitudinal direction and in the experiment said direction was oriented east-west on the operating site. The density sensor was fixed on one end of the case so as to be exposed to solar radiation only in the afternoon. Curve 21 shows density as calculated for each pair of pressure and temperature readings obtained simultaneously, and it reveals two distinct kinds of behavior of the sensor. A first kind of behavior is characterized by the density remaining flat 21A at around the nominal value of 3.5 bars and corresponds to pairs of pressure and temperature readings made during the day and in the absence of significant solar radiation. A second kind of behavior which corresponds to readings performed in daytime and in the presence of significant solar radiation is characterized by daily variation 21B of the density, during which the density is initially greater than the nominal value and subsequently less than the nominal value, with the transition between the positive and negative parts of the variation corresponding substantially to the sun being at its zenith.

The real density of $SF_6$ inside the case remained constant and equal to its nominal value, as is shown by the flat curve produced on each day that readings were taken in the absence of significant solar radiation. In fact, the daily variation of density in the presence of significant sunshine represents an artifact of measurement. Such an artifact does not prevent the rate of leakage from the case being monitored insofar as it is easy to make use only of readings performed in the absence of significant solar radiation when calculating density. However, a problem arises when the amplitude of the daily variation in the calculated density value on a day of significant sunshine drops significantly below the density threshold, as referenced at 20 in FIG. 1. This happens in particular when the density of the gas contained inside the case has in any event moved closer to the threshold after several years of operation because of the inevitable minimal leakage. When the threshold is crossed, an alarm is generated by the negative portion of the variation in density as calculated by the density sensor on a day of significant sunshine, and that alarm is considered to be untimely insofar as the density threshold will not genuinely be crossed for several more weeks or even several more months.

OBJECT AND SUMMARY OF THE INVENTION

The object of the invention is to provide a density sensor for monitoring a rate of leakage from the case of electrical switchgear, which sensor provides better reliability concerning detection of a density threshold being crossed.

The idea on which the invention is based is to seek to transform the measurement artifact of the density sensor into density variations having values that are always equal to or greater than the nominal value, so as to avoid any risk of the density threshold being crossed in an untimely manner.

To this end, the invention provides a density sensor for monitoring a rate of leakage from the case of electrical switchgear filled with dielectric gas under pressure, the sensor comprising a fixing support mounted from the outside in the thickness of the case and communicating with the dielectric gas, wherein a radiator is disposed around the fixing support of the density sensor.

By providing for heat exchange between the fixing support of the density sensor and the ambient medium around the case, generally atmospheric air, the radiator changes the thermal equilibrium of the temperature detector and of the dielectric gas so as to transform variations of the density as calculated during sunny days which include both positive parts and negative parts into variations which include positive parts only. This means that any risk of a density threshold being crossed in an untimely manner due to a measurement artifact generated by readings made in the presence of significant sunlight is eliminated.

It should be observed that variations in the density calculated by the sensor of the invention during readings performed in the presence of significant sunlight and constrained to be positive only nevertheless remain small in amplitude compared with a genuine leak which will continue to be detected with negligible delay by the density sensor. Similarly, the amplitude of the positive variations will not have any prejudicial consequence on crossing a high density threshold for the case.

BRIEF DESCRIPTION OF THE DRAWINGS

Other characteristics and advantages of the invention appear on reading the following description as illustrated by the drawings.

MORE DETAILED DESCRIPTION

Figure 2:
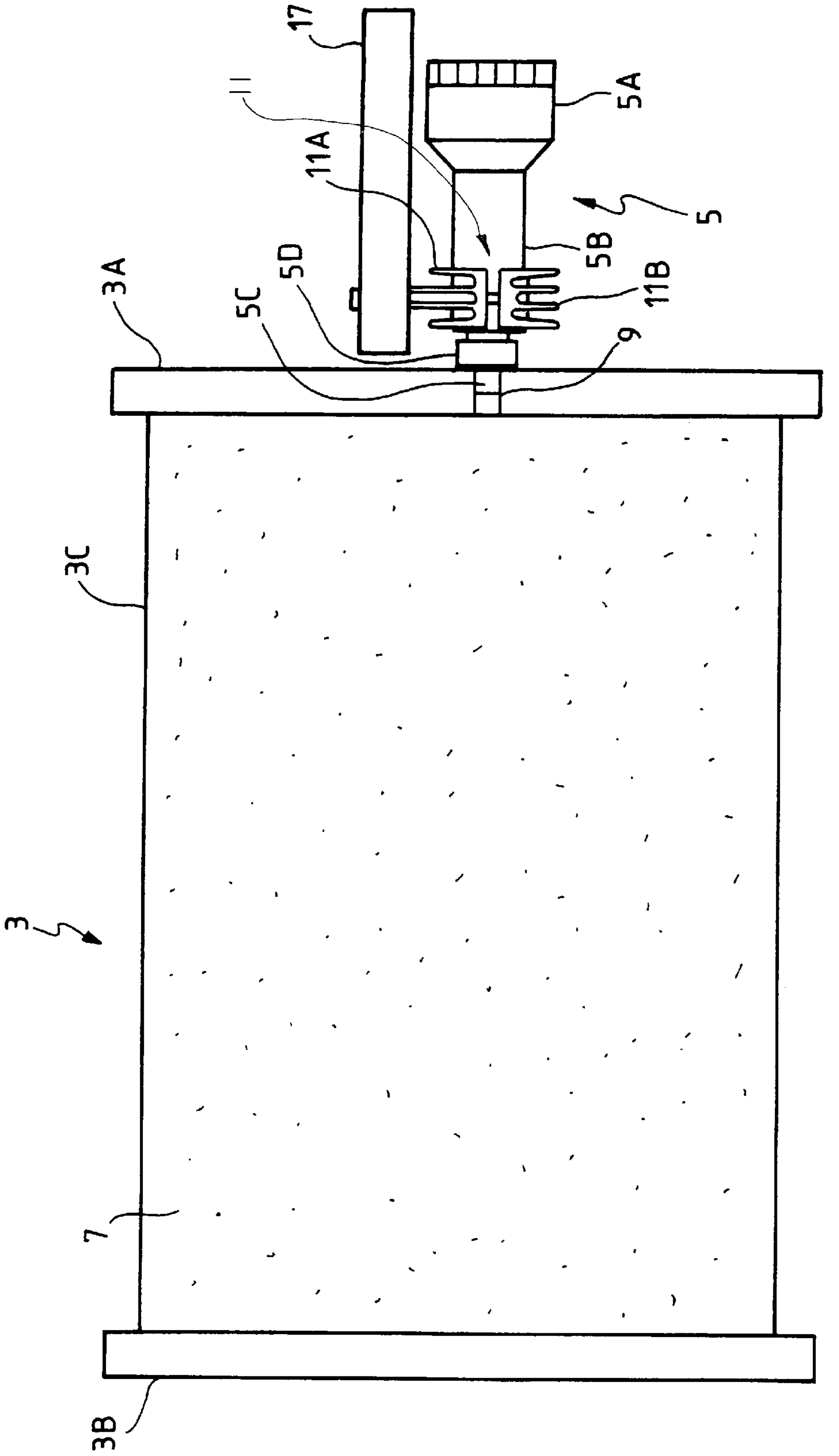
FIG. 2 is a diagram showing the case of electrical switchgear in which a density sensor of the invention to which has been fitted.
Figure 3:
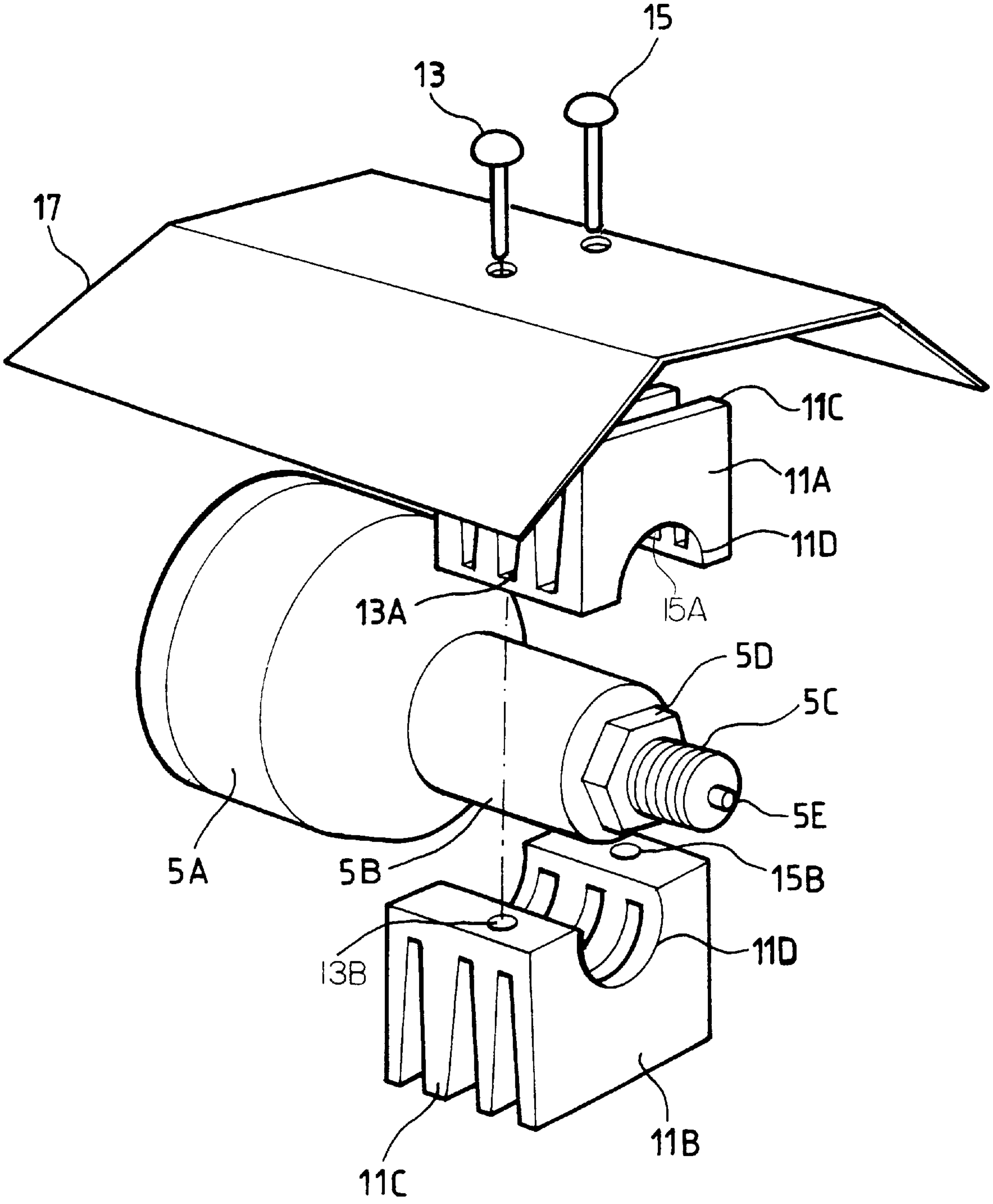
FIG. 3 is an enlarged view of a density senor of the invention.

The invention relates to a density sensor for monitoring the rate of leakage from the case of an electrical switchgear that is filled with a dielectric gas under pressure, the device having a fixing support mounted from the outside in the thickness of the case and in communication with the dielectric gas. A density sensor 5 and the case 3 of an electrical switchgear are shown in FIG. 2. By way of example, the switchgear may be a network circuit breaker or a generator circuit breaker, or a metal-clad substation, and it is located inside the case 3 which has a dielectric gas 7, e.g. $SF_6$, injected therein at a pressure of abut 3.5 bars. The case 3 has a central body 3C of cylindrical shape and is closed by two opposite covers 3A and 3B bolted to the central body 3C. The density sensor 5, which can also be seen in FIG. 3, is of a conventional type and in outline comprises a cylindrical fixing support 5B surmounted by a measurement unit 5A and terminated at its other end by a threaded tube 5C for screwing into a duct 9 formed through the wall thickness of the case 3 to communicate with the dielectric gas. The density sensor is mounted on the case from the outside and it is tightened by means of a hexagonal head 5D. A pressure detector and a temperature detector are housed in the fixing support 5B and project beyond the threaded tube 5C in the form of a protection tube 5E to communicate with the dielectric gas 7 contained in the duct 9 through the case 3. The pressure and temperature detectors are connected to the measurement unit 5A of the density sensor to which they supply respective signals representing the detected pressure P and the detected temperature T. An electronic circuit integrated in the measurement unit 5A serves to determine a density value for each pair of pressure and temperature values that are detected simultaneously, said circuit making use of an equation of state for the dielectric gas. Each density value is transmitted to a monitoring unit which compares it with a low threshold value and with a high threshold value and which triggers an alarm in the event of either threshold being crossed by a density value.

Figure 1:
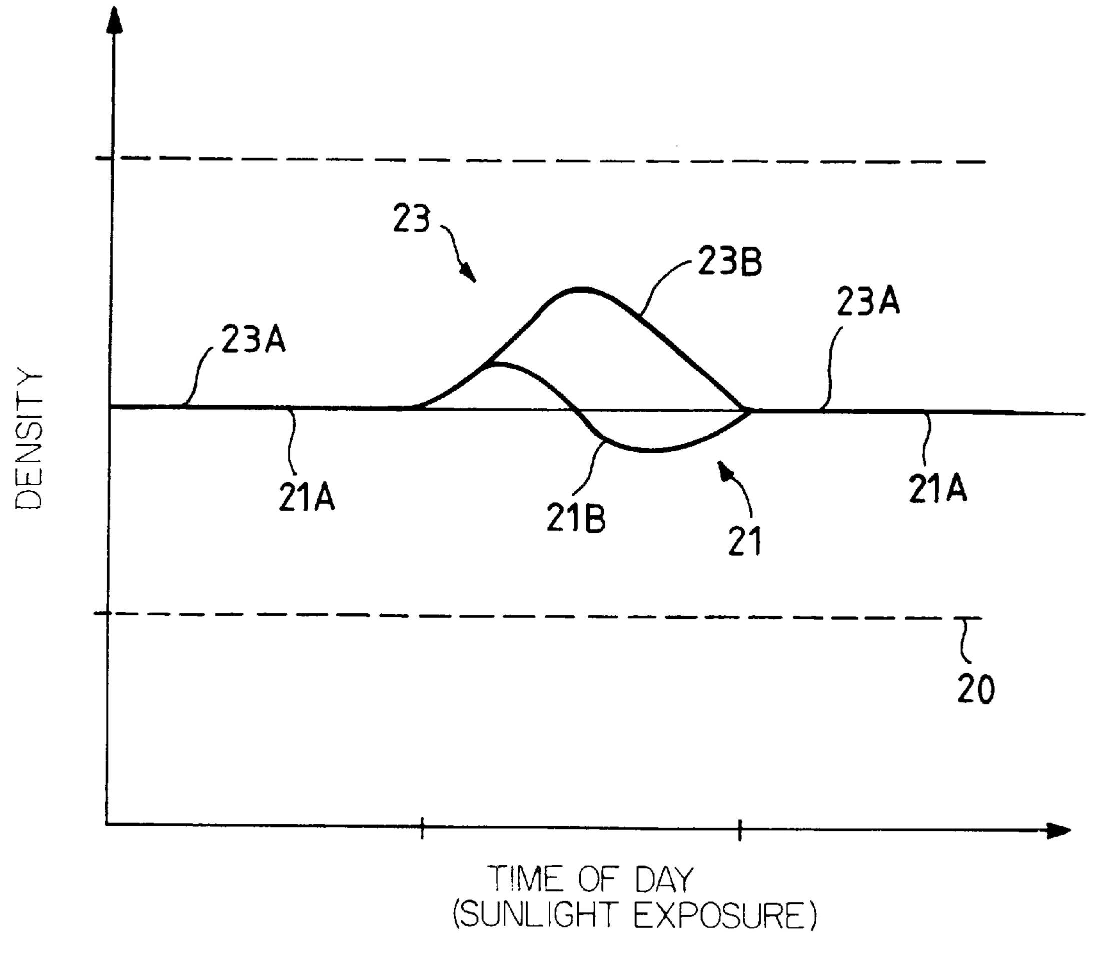
FIG. 1 shows the curves of two sets of density readings, one made using a density sensor without a radiator and the other with a density sensor of the invention.

According to the invention, a radiator is placed around the fixing support of the density sensor. In FIGS. 2 and 3, a radiator 11 is shown that is made up of two portions 11A and 11B each having four identical fins 11C to increase the area of heat exchange between the radiator and the surrounding air. Each portion 11A and 11B has a semicylindrical recess 11D so as to enable the two portions to be pressed around the cylindrical fixing support 5B by means of two assembly screws 13 and 15 which pass through the two portions 11A and 11B via holes 13A, 13B, 15A, and 15B. In FIG. 2, the radiator 11 is shown mounted around the fixing support 5B while also being in contact with the clamping screw 5D to have an influence on the heat exchanges which take place between the temperature detector and the dielectric gas contained inside the duct 9. FIG. 1 shows a plot 23 of density values as calculated by the density sensor of the invention on the basis of each pair of pressure and temperature values that are detected simultaneously. Above-described plot 21 is also shown. In addition, it can be seen at 23A that the radiator does not modify the behavior of the density sensor for readings made in the absence of significant solar radiation. This first result thus enables the density sensor of the invention to be used to monitor a leakage rate from the case by making use only of readings performed in daytime and in the absence of significant solar radiation. In addition, it is observed that the second behavior of the density sensor is modified for readings performed in the presence of significant sunlight, in that the density values supplied by the sensor of the invention are always equal to or greater than the real value of the density, with variation 23B that increases in the morning and decreases in the afternoon.

One possible explanation proposed for explaining the behavior of the density sensor of the invention is as follows. The purpose of measuring temperature simultaneously with pressure is to make temperature compensation possible and thereby make it possible to ignore decreases in pressure that result not from a loss of mass or a leak of dielectric gas from the case, but merely from the dielectric gas contracting under the effect of a decrease in its temperature. However, the temperature compensation of pressure that is provided thereby is valid only on the condition that the measured decrease in temperature is large enough compared with the temperature difference that inevitably exists between the temperature measured by the temperature detector and the real temperature of the dielectric gas in which the detector is immersed and in the vicinity of which the pressure detector measures pressure. If the temperature measured by the temperature detector is higher than the real temperature of the dielectric gas, then the density sensor will calculate a density value that is lower than the real density if it compensates the pressure as measured by means of the temperature as measured. Similarly, if the temperature as measured is lower than the real temperature of the dielectric gas, then the density sensor will calculate a density value that is higher than the real density by making its temperature compensation. In the experiment shown in FIG. 1, the temperature detector exchanged heat with the dielectric gas and with the fixing support of the sensor which itself was mounted in the thickness of the case. As a result, thermal equilibrium between the detector and the dielectric gas was influenced by the fixing support and by the case. In the absence of sunshine, the case and the fixing support had negligible influence on the thermal equilibrium of the dielectric gas and of the temperature detector, so the temperature as measured was close enough to the real temperature of the dielectric gas for the density sensor to calculate a density value that is substantially true to the real value. Logically, it was expected that under such conditions, the radiator placed around the fixing support and close to the case would have no thermal effect of its own. This was indeed observed, as shown in curves 21A and 23A which relate to readings taken in daytime and in the absence of significant sunshine. However, in the presence of significant sunshine, the fixing support and the case disturbed thermal equilibrium between the temperature detector and the dielectric gas in a manner that differed depending on the period of the day under consideration. In the morning, the density sensor was in shadow, such that the fixing support and consequently the temperature detector with which it was in contact, heated up more slowly than the dielectric gas which absorbed the heat transmitted thereto by the case which was itself exposed to the solar radiation. The rate at which the detector and the fixing support heated up was further reduced by the presence of the radiator which dumped heat transferred from the dielectric gas to ambient air. This meant that the temperature measured by the temperature detector was lower than the real temperature of the dielectric gas, thus causing the density sensor to supply a density value that was higher than the real value, with this difference being accentuated by the presence of the radiator, as shown by the positive portions of the variations of the curves 21B and 23B in FIG. 1. In the afternoon, the sensor which had been in the shade became progressively exposed to radiation from the sun. Its temperature and also the temperature of the temperature detector with which it was in contact rose much more quickly than did the temperature of the dielectric gas because of the different thermal inertias of the dielectric gas, the fixing support, and the detector. As a result, the density sensor delivered a density value which was lower than the real density value, as can be observed in curve 21B. In the presence of a radiator, the rate of increase in the temperature of the fixing support and of the detector was slowed down by the heat supplied by the case (which was itself exposed to the solar radiation) being evacuated into the ambient air. The rate at which the fixing support and the detector heated up was slowed down by the radiator so that the temperature thereof did not become greater than the real temperature of the dielectric gas during the afternoon. Under such conditions, the density as supplied remained equal to or greater than the real density, as can be observed from curve 23B.

In an advantageous embodiment of the invention, the density sensor is provided with a cap for protecting it from solar radiation. In FIGS. 2 and 3, a cap 17, e.g. made of a reflecting metal, is fixed on the portion 11A of the radiator 11 by means of the screws 13 and 15 so as to reflect away the solar radiation which strikes the sensor and a portion of the solar radiation which strikes the case in the vicinity of the duct 9 in which the sensor is mounted. The screws 13 and 15 are preferably made of a material that is a poor conductor of heat, e.g. nylon, so as to isolate the radiator cap thermally. In this embodiment, it was observed that the cap reinforced the effect of the radiator insofar as the density values calculated from the readings performed in the presence of significant sunshine were higher than those which the density sensor supplied in the absence of the cap. As a result, plans have been made to optimize the number of radiator fins, so as to obtain density sensor behavior in the presence of a cap that is substantially equivalent to behavior in the absence of the cap.

Finally, the east to west orientation of the case on the installation site represents the least favorable exposition to solar radiation, so the results of FIG. 1 constitute an application that is particularly advantageous but is not limiting for the density sensor of the invention.

What is claimed is:

1. A density sensor for monitoring a rate of leakage from a case of an electrical switchgear filled with a dielectric gas under pressure, the density sensor comprising:

a fixing support mounted from an outside of the case and communicating with the dielectric gas; and at least one detector element housed by the fixing support, wherein a radiator is disposed around the fixing support of the density sensor.

2. The density sensor of clam 1, in which a cap is placed over the radiator.

3. The density sensor of claim 2, in which the cap is fixed to the radiator by screws made of a material that is less heat conductive than a material which forms the radiator.

* * * * *